United States Patent [19]
Mitani

[11] Patent Number: 4,526,502
[45] Date of Patent: Jul. 2, 1985

[54] SLIDE FORK POSITIONING APPARATUS

[75] Inventor: Yoshio Mitani, Gifu, Japan

[73] Assignee: Murata Kikai Kabushiki Kaisha, Kyoto, Japan

[21] Appl. No.: 380,812

[22] Filed: May 21, 1982

[30] Foreign Application Priority Data

May 24, 1981 [JP] Japan ................................ 56-79009

[51] Int. Cl.[3] ................................................ B65G 1/06
[52] U.S. Cl. ..................................... 414/282; 414/664
[58] Field of Search ......................... 414/282, 662-664, 414/667, 668, 671, 270, 273, 281, 401, 666, 669

[56] References Cited

U.S. PATENT DOCUMENTS 3,430,794 3/1969 Nash ................................... 414/671
3,568,861 3/1971 Atwater et al. ................ 414/282 X
3,757,899 9/1973 Smith, Jr. ....................... 414/664 X
3,888,360 6/1975 Ando et al. ......................... 414/662
3,934,741 1/1976 Wentz ............................ 414/282 X
4,014,442 3/1977 Adelson et al. ..................... 414/282

*Primary Examiner*—Joseph E. Valenza
*Assistant Examiner*—David A. Bucci
*Attorney, Agent, or Firm*—Spensley Horn Jubas & Lubitz

[57] ABSTRACT

An apparatus for positioning a slide fork provided on a stacker crane is provided wherein the slide fork is movable on the crane and can be positioned relative to a load rack, independently of the crane, and also fixed to a definite position on the crane. According to the apparatus, since the slide fork is directly positioned, the precision of the positioning is improved, substantially.

10 Claims, 6 Drawing Figures

SLIDE FORK POSITIONING APPARATUS

BACKGROUND OF THE INVENTION

This invention relates to an apparatus for positioning slide forks provided on stacker cranes used for auto warehouses, etc. relative to load racks. A positioning means for vehicles is disclosed in U.S. Pat. Nos. 3,123,240 and 4,109,804.

In the case of conventional stacker cranes, slide forks by which loads are delivered to or from load racks have been fixed onto stacker cranes (referred to hereinafter as cranes). On the other hand, in recent years, rationalization of machining process has been advanced, and a system of delivering works or the like from cranes directly to machine tools or auto-conveyors has been developed. In the case of such a system, the precision of positioning at the time of the delivery is very important since it determines the precision of the subsequent process. Thus, even when works, etc. are transferred from load racks onto slide forks, a problem is raised as to how to transfer works, etc. to a definite position on the slide forks. However, in the case where slide forks are conventionally fixed onto cranes, one cannot help positioning cranes relative to load racks. But it is extremely difficult to position large, heavy weight cranes at a high precision and rapidly.

In view of this fact, the object of the present invention is to provide an apparatus wherein light weight slide forks are made freely movable on cranes and directly positioned relative to load racks to thereby improve the precision and efficiency of the positioning.

SUMMARY OF THE INVENTION

The present invention relates to an apparatus for positioning slide forks provided on stacker cranes relative to load racks.

According to the present invention, the slide fork is made freely movable relative to the stacker crane in the horizontal direction, an engaging member which is freely projectable in the direction of the load rack is attached onto the slide fork and an engaging member which can engage with the former engaging member is provided on the side of the load rack. A centering means for fixing the slide fork to a definite position relative to the stacker crane is further provided on the side of the stacker crane or on the side of the slide fork.

The apparatus of the present invention is so constructed that the slide fork is movable on the crane to enable it to be positioned relative to the load rack, independently of the crane, and also fixed in a definite position with respect to the crane. Thus precision positioning of the heavy crane is not necessary and the time required for the positioning is shortened. Further, a heavy duty means for stopping the crane at a definite position is unnecessary and the system as a whole is cheap and simple. Further, since the slide fork is directly positioned, the precision of its positioning is improved substantially as compared with the indirect positioning of the slide fork accomplished by moving the crane body.

DESCRIPTION OF THE PREFERRED EMBODIMENTS

Figure 2:
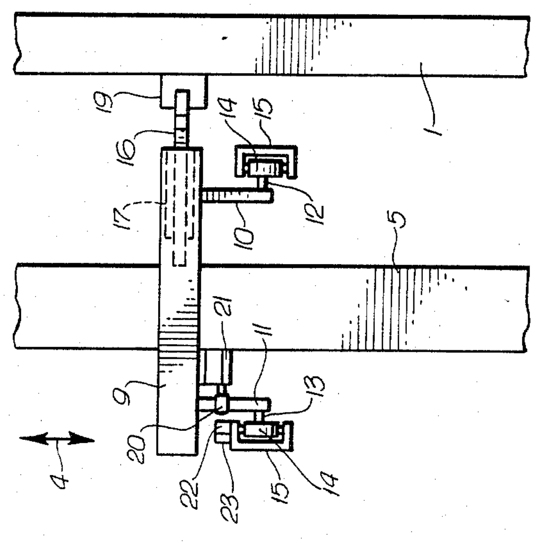
FIG. 2 shows a view seen from A—A arrows in FIG. 1 with some elements of FIG. 1 being omitted for clarity.
Figure 1:
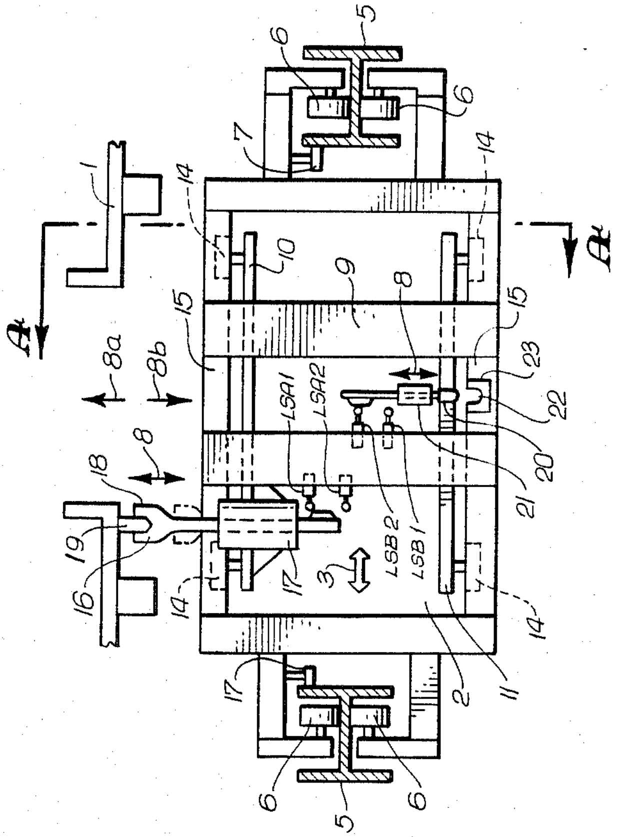
FIG. 1 shows a plan view of a positioning apparatus as an embodiment of the present invention.

In FIGS. 1 and 2 illustrating an embodiment of the present invention, a crane lift bed 2 travels in the horizontal direction (the direction of arrow mark 3) or in the vertical direction (the direction of arrow mark 4) in front of a load rack 1. Guide rollers 6, 7 in rolling contact with vertical frames 5 of the body of the crane prevent the movement of the crane lift bed 2 in the direction of arrow mark 8 and in the direction of arrow mark 3, relative to the body of the crane. A pair of arms of a slide fork 9 attached on the lift bed 2 are movable in the direction of arrow mark 8*a* to transfer works, etc. from the load rack 1 onto the lift bed 2. Two frames 10, 11 which extend in the direction of arrow mark 3 are fixed to the lower surface of the slide fork 9 (FIG. 2) and include projecting shafts 12 and 13. Freely rotatable guide rollers 14 attached to these shafts 12, 13 are fitted in guide rails 15 (which also form a part of the main frame of the lift bed 2), whereby the slide fork 9 is freely movable in the direction of arrow mark 3. Onto one end of this frame 10 is fixed an actuator 17 for extending or retracting an engaging member 16 in the direction of arrow mark 8. The engaging member 16 has a tapered groove 18 at its tip end. At a definite position on the front of the load rack 1 is secured a wedge form projection 19 as an engaging member which can engage with the engaging member 16 when the member 16 is extended and comes to the projection 19. Further, onto the base surface of the slide fork 9 at the center thereof is fixed an actuator 21 which has a wedge member 20 as a centering means and advances or retreats the wedge member 20 in the direction of arrow mark 8. Further, on the center of the guide rails 15 is a positioning block 23 having a tapered cavity 22 for receiving the wedge member 20.

Figure 5:
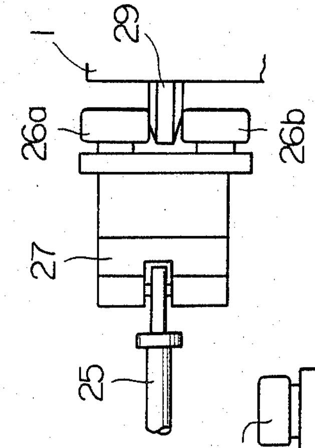
FIG. 5 shows a plan view illustrating the above relationship in FIG. 4.
Figure 3:
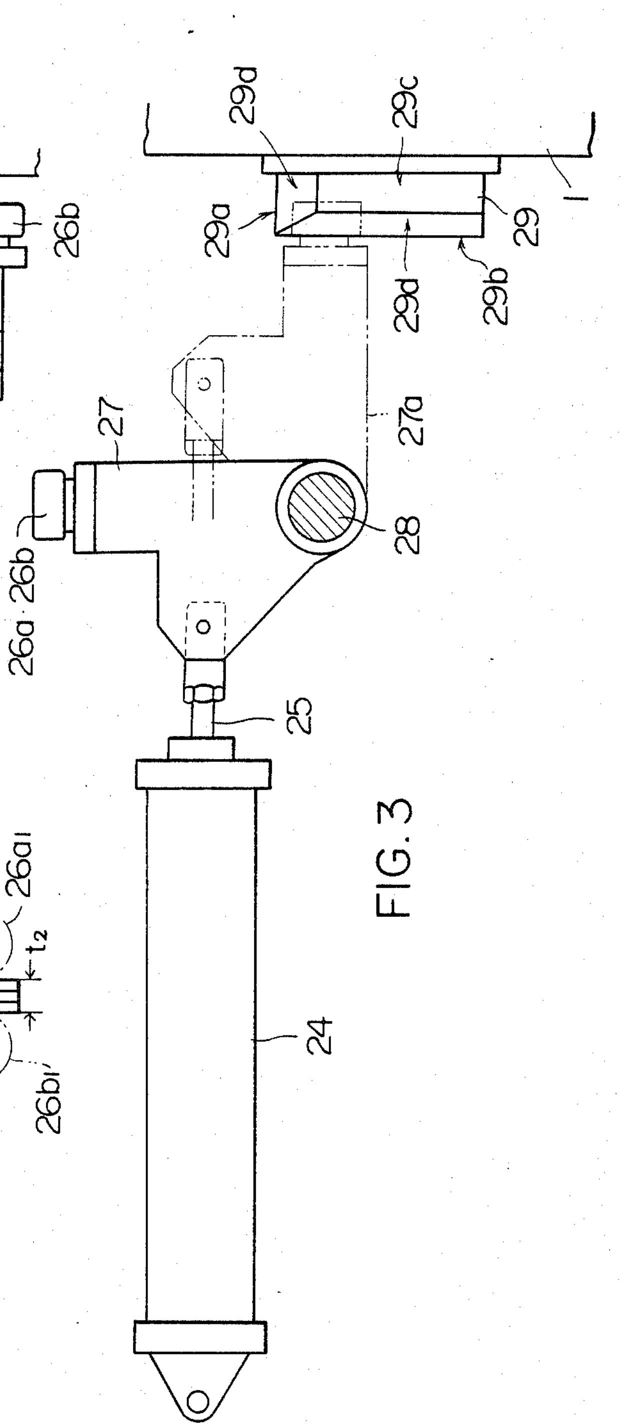
FIG. 3 shows a side view of a slide fork positioning apparatus as another embodiment of the present invention.
Figure 4:
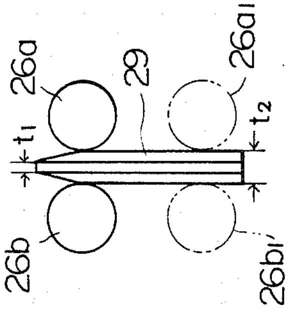
FIG. 4 shows a front view illustrating the relationship between rollers and an engaging member in the apparatus of FIG. 3.

FIGS. 3, 4 and 5 show another embodiment of the engaging means between the slide fork 9 and the load rack 1. Namely, to a piston rod 25 of a fluid cylinder 24 provided at one end of the frame 10 for supporting the slide fork is pivotably connected an engaging member 27 having two rollers *26a, 26b*. This engaging member 27 is pivotably supported about a shaft 28 fixed to the frame 10, pivots in a range up to about 90°, and is movable between a position of solid line 27 and a position of two-point chain line *27a*. On the other hand, onto the side of the rack 1 is fixed an engaging member 29 having a tapered surface so that the above rollers *26a, 26b* can engage the member 29. This engaging member 29 is a plate form body longer in the longitudinal direction, the widths of its upper end 29*a* and its front end 29*b* being both $t_1$, the width of its flat surface part 29*c* being $t_2$, $t_1$ less than $t_2$, and the region which the rollers *26a, 26b* initially engage having tapered surfaces 29*d*.

Thus, when the piston rod 25 of the fluid cylinder 24 is advanced, the engaging member 27 pivots around the shaft 28 in the clockwise direction as shown in FIG. 3, and the rollers 26*a*, 26*b* engage the engaging member 29 while being regulated by both the side surfaces of the member, as shown in FIG. 5, and pivots to position 27*a* shown in FIG. 3, to effect positioning. In addition, the state of the rollers 26*a*, 26*b* in FIG. 4 is directed to positioning on the upper level of the fork i.e. positioning at the time when the load on the fork is housed on the rack, while the state of the rollers 26*a*1, 26*b*1 shown by two-point chain line is directed to positioning on the lower level of the fork, i.e. positioning at the time of delivery of the load.

Next, the positioning operation will be described. During the travel of the crane, the wedge member 20 is energized by the actuator 21 in the direction of arrow mark 8*b*, and the wedge member 20 engages with the tapered cavity 22, whereby the slide fork 9 is fixed to the position of the axial center of the lift bed 2. When the crane comes to the front of an indicated load rack 1 and stops there, the actuator 21 is released and the wedge member 20 is retracted from the tapered cavity 22, and at the same time the actuator 17 is actuated to project the engaging member 16 in the direction of arrow mark 8*a*, whereby the tapered groove 18 of the engaging member 16 engages with the wedge form projection 19. At the time of this engagement, the slant of the tapered groove 18 comes into contact with the slant of the wedge form projection 19, and the engaging member 16 advances while it is guided by the contact; hence the engaging member 16 and the slide fork 9 move by wedge action in the direction in which the deviation between the member 16 and projection 19 is corrected. When the engagement has been completed, the slide fork 9 is positioned to a definite position relative to the load rack 1 and fixed there. Thus, the work housed at a definite position relative to the load rack 1 is transferred to a definite position on the slide fork 9. When the transfer of the work has been completed, the actuator 17 is deactivated and the actuator 21 activated, whereby the wedge member 20 is extended into the tapered cavity 22, and by the resulting wedge action, the slide fork 9 moves to the center of the lift bed 2, and as a result, the work also moves to the center of the lift bed and stops there. After completion of the above operation, the lift bed travels to the next indicated position. In the case where works, etc. are housed on the load rack, the above operattion is reversely carried out, whereby it is possible to house works to a correct position.

Figure 6:
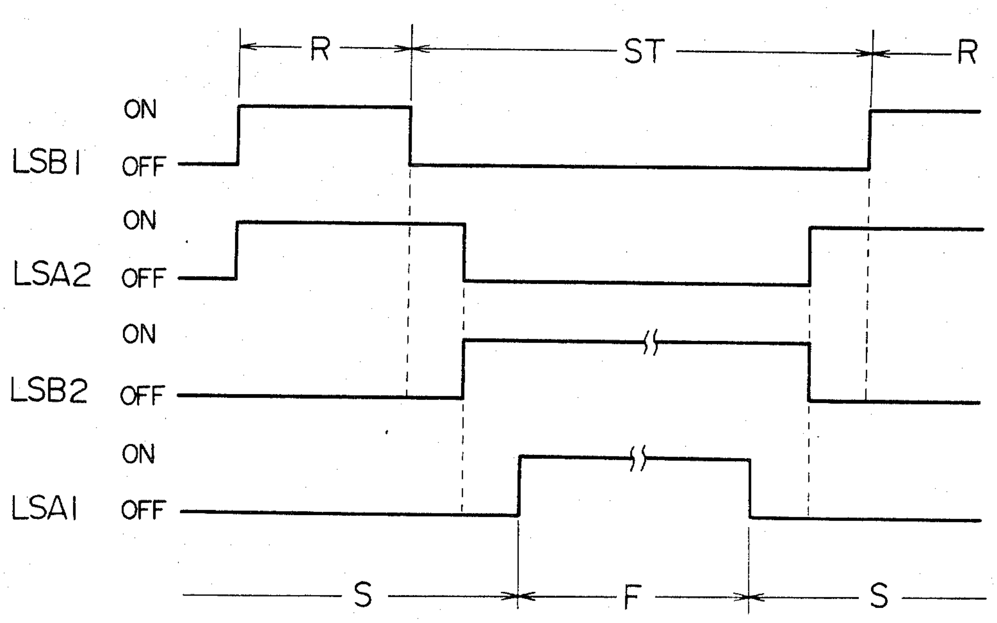
FIG. 6 shows a time chart of a group of limit switches illustrating actuations for positioning a slide fork.

The above actuation is shown in a time chart of limit switches of FIG. 6. Namely, four limit switches, $LSA_1$, $LSA_2$, $LSB_1$ and $LSB_2$ are at the respective positions shown in FIG. 1, and limit switches $LSA_1$, and $LSA_2$ are used for detecting the position of the actuator 17 for actuating and engaging member 16 between the fork and the rack 1, while limit switches $LSB_1$ and $LSB_2$ are used for detecting the position of the actuator 21 for actuating the engaging member 20 between the fork and the lift bed. Namely, in the state R where the switch $LSA_1$ is off and the switch $LSB_1$ is on, the crane can travel, but in the state ST where the switch $LSB_1$ is off and the switch $LSA_1$ is on, the crane cannot travel. Further, in the state F where the switch $LSB_1$ is off and the switch $LSA_1$ is on, a fork cycle is possible.

It is also possible to provide the wedge form projection 19 on the side of the engaging member 16 and provide the tapered groove 18 to engage with the projection on the side of the load rack 1. Further, it is also possible to provide the actuator 21 on the side of the lift bed 2 and provide the wedge form cavity 22 on the side of the slide fork 9.

What is claimed is:

1. An apparatus for positioning a slide fork provided on a stacker crane which is movable in the horizontal direction and in the vertical direction along a load rack, characterized in that said slide fork is made freely movable relative to said stacker crane in the horizontal direction and includes a first engaging member which is freely projectable in the direction of said load rack, wherein a second engaging member which can engage with the first engaging member to lock the slide fork to a definite position with respect to the load rack is provided on the side of said load rack and wherein the apparatus further includes a centering means for positioning and locking said slide fork to a definite position relative to said stacker crane, wherein the centering means is actuated during horizontal movement of the stacker crane along the load rack and is released when the stacker crane arrives at a desired position and wherein the first engaging member is then projected toward the second engaging member to position and lock the slide fork with respect to the load rack.

2. An apparatus as claimed in claim 1, wherein said slide fork is attached onto a lift bed of the crane and is movable toward a load rack to transfer works from the load rack onto the lift bed and wherein said slide fork includes (a) two elongated frame members fixed onto the lower surface thereof in the direction parallel to the row of the load racks, (b) shafts projecting from the frames (c) freely rotatable guide rollers attached to the shaft and (d) guide rails which extend parallel to the frame members and are secured to the lift bed, wherein the slide fork is freely movable in the horizontal direction along the line parallel to the row of the load racks.

3. An apparatus as claimed in claim 2, wherein said first engaging member attached onto the slide fork comprises an engaging member having a tapered groove at the tip end and an actuator for projecting or retreating the engaging member toward the load rack and said second engaging member provided on the side of the load rack is a wedge form projection which can engage with the tapered groove of the first engaging member.

4. An apparatus as claimed in claim 2, wherein said first engaging member comprises a fluid cylinder secured to the slide fork, an engaging plate pivotably connected to a piston rod of the fluid cylinder and pivotably supported with respect to a shaft fixed to the frame and two rollers supported on the engaging plate freely rotatably and disposed to have some distance therebetween and a second engaging member having a tapered surface is fixed onto the load rack so that the second engaging member can be engaged by the rollers when the piston rod of the fluid cylinder is advanced and the engaging plate pivots about the shaft.

5. An apparatus as claimed in claims 1, 3 or 4, wherein said centering means for fixing the slide fork comprises a wedge member, an actuator fixed onto the slide fork, said actuator for extending and retracting the wedge member, and a positioning block having a tapered cavity receptive of the wedge member therein and fixed with respect to the stacker crane.

6. An apparatus for loading and unloading objects from a load rack having a plurality of object locations in the horizontal and vertical directions, comprising:

a stacker crane which is adjacent the load rack and movable horizontally along the load rack;

a slide fork carried on the stacker crane and vertically movable with respect thereto, said slide fork including at least one member movable toward and away from the load rack to facilitate transfer of objects between the stacker crane and load rack, said slide fork being movable horizontally with respect to the stacker crane in the direction along the load rack;

first engaging means for positioning and locking the slide fork in a predetermined horizontal position with respect to the load rack thereby to facilitate transfer of objects between the slide fork and load rack; and second engaging means for positioning and locking the slide fork in a predetermined horizontal position with respect to the stacker crane thereby to facilitate movement of the stacker crane, wherein in operation the second engaging means is actuated and the crane is moved horizontally along the load rack to a desired position, the second engaging means is then deactivated and the first engaging means actuated to position and lock the slide fork with respect to the load rack.

7. An apparatus according to claim 6 wherein the first engaging means comprises a fixed engaging element located on the load rack and an extendable engaging element located on the slide fork, one of said engaging elements including a wedge-shaped projection and the other of said engaging elements including a tapered groove into which the projection is inserted.

8. An apparatus according to claim 7 wherein the fixed engaging element includes a wedge-shaped projection and the extendable engaging element includes a tapered groove.

9. An apparatus according to claim 6 wherein the second engaging means comprises a fixed engaging element on one of the stacker crane and slide fork and an extendable engaging element on the other of the stacker crane and slide fork, one of said engaging elements including a wedge-shaped projection and the other of said engaging elements including a tapered groove into which the projection is inserted.

10. An apparatus according to claim 9 wherein the fixed engaging element is located on the stacker crane and includes a tapered groove and the extendable engaging element is located on the slide fork and includes a wedge-shaped projection.

* * * * *